United States Patent [19]

Ikeda et al.

[11] 4,080,344

[45] Mar. 21, 1978

[54] PROCESS FOR THE PRODUCTION OF EXPANDABLE ETHYLENICALLY UNSATURATED POLYMER PARTICLES

[75] Inventors: Toshiki Ikeda, Shiga; Fumito Yamai, Kusatsu; Tomohiko Ishida, Shiga, all of Japan

[73] Assignee: Sekisui Kaseihin Kogyo Kabushiki Kaisha, Osaka, Japan

[21] Appl. No.: 555,087

[22] Filed: Mar. 4, 1975

[30] Foreign Application Priority Data

Mar. 28, 1974 Japan .................................. 49-35267
Oct. 23, 1974 Japan ................................ 49-122920

[51] Int. Cl.² ............................ C08J 9/18; C08J 9/22
[52] U.S. Cl. .......................... 260/2.5 HB; 260/2.5 R; 260/2.5 B; 260/2.5 H; 260/2.5 HA
[58] Field of Search ........... 260/2.5 R, 2.5 HB, 2.5 B, 260/2.5 HA

[56] References Cited

U.S. PATENT DOCUMENTS

| | | | |
|---|---|---|---|
| 3,615,811 | 10/1971 | Barrett | 423;106/430 X;306 |
| 3,661,810 | 5/1972 | Gahmig | 260/2.5 B |
| 3,743,611 | 7/1973 | Muroi et al. | 260/2.5 B |
| 3,819,546 | 6/1974 | Altares | 260/2.5 B |
| 3,870,663 | 3/1975 | Clemens et al. | 260/2.5 B |
| 3,886,100 | 5/1975 | Yasuda et al. | 260/2.5 B |
| 3,888,945 | 6/1975 | Arndt et al. | 260/2.5 B |
| 3,900,433 | 8/1975 | Taub et al. | 260/2.5 B |

OTHER PUBLICATIONS

Frisch et al., Plastic Foams, I Part II, p. 531.

*Primary Examiner*—Allan Liebermann
*Attorney, Agent, or Firm*—Armstrong, Nikaido, Marmelstein & Kubovcik

[57] ABSTRACT

Expandable ethylenically unsaturated polymer particles are produced by using in the process a suspension stabilizer comprising calcium carbonate particles having the surfaces thereof treated with resin acid. The method for the production of such expandable ethylenically unsaturated polymer particles from ethylenically unsaturated polymer particles includes suspending such particles in water and impregnating the particles with an organic expanding agent having a boiling point lower than the softening point of the polymer particles.

9 Claims, No Drawings

PROCESS FOR THE PRODUCTION OF EXPANDABLE ETHYLENICALLY UNSATURATED POLYMER PARTICLES

BACKGROUND OF THE INVENTION

Expandable ethylenically unsaturated polymer particles are conventionally prepared by the process of dispersing in water ethylenically unsaturated polymer particles to form a suspension wherein a volatile liquid organic expanding agent having a boiling point lower than the softening point of the polymer particles is then added and impregnated into the particles as disclosed in the specification of U.S. Pat. Nos. 2,893,963 and No. 2,950,261. But there has been a tendency of ethylenically unsaturated polymer particles, during the impregnation, to agglomerate or stick together to form large clumps because of the solvent action of the expanding agent during the impregnation of the above-mentioned polymer particles with the abovementioned expanding agent. The agglomeration is further accelerated when the impregnation temperature is raised to over 80° C in order to reduce the impregnation period. In order to prevent agglomeration of the polymer particles during the impregnation step, a suspension stabilizer is generally used. As to such suspension stabilizers, it is known to use suspension stabilizers which are generally available to make ethylenically unsaturated polymer particles by suspension polymerization of ethylenically unsaturated monomers. Examples of such stabilizers include, fine powders which are slightly water-soluble, such as inorganic compounds of calcium phosphate, magnesium pyrophosphate, calcium carbonate, calcium silicate and bentonite; fatty acid salts such as calcium stearate and zinc stearate, and organic fine powders such as fatty acid bis-amide e.g., ethylene-bis-stearoamide. The above-mentioned suspension stabilizers, however, are not suitable from the economical stand point, since each of the suspension stabilizers have to be used in great quantities when used alone, in order to prevent the agglomeration of the polymer particles caused by expanding agent. Furthermore, agglomeration is further accelerated when the impregnation temperature is increased in order to reduce the impregnation period, and so fine powders have to be used much more than above, which provides no industrial merits. As a result, the increased cost is not desirable and furthermore, the use of large quantities of stabilizer presents problems for waste water treatment.

It has been proposed to use suspension stabilizers together with a surface active agent in order to prevent agglomeration of the polymer particles by using as little suspension stabilizers as possible, as in the case of using a fine powder of inorganic compounds as suspension stabilizers. For example, the specification of U.S. Pat. No. 2983,692 shows that the effect of suspensions is increased by using anionic surface active agents together with fine powders of inorganic compounds. The use of anionic surface active agents gives assistance in dispersing the inorganic compounds and prevents agglomeration of the polymer particles. It is well known to employ a process using calcium phosphate and sodium dodecylbenzenesulfonate.

The process of using ordinary surface active agents is not suitable, although the process is effective to prevent agglomeration of the polymer particles, since vigorous foaming is caused by the surface active agent when recovering and/or releasing the remaining expanding agent after the impregnation step. It is, therefore, difficult to recover and/or release the expanding agent. Therefore, it is necessary to use anti-foam agents in order to break the foam, and to provide expensive equipment in order to completely remove the surface active agent during the treatment of any waste water.

Fine powders of organic compounds, such as calcium stearate and ethylene-bis-amide can also be used together with anionic, nonionic and amphoteric surface active agents, but these compounds are not as effective as mixtures of inorganic compounds and anionic surface active agents.

Water-soluble organic compounds such as partially saponified polyvinylalcohol, polyacrylate, polymethacrylate, polyvinylpyrolidone, carboxymethyl cellulose, ethyl cellulose, methyl cellulose and sodium alginate may also be used as suspension stabilizers without causing agglomeration of the polymer particles. However, the upper temperature limit of such a process using the above compounds is up to 80° C. When the process is carried out above 80° C, impregnation of the expanding agent becomes difficult. Therefore, it is impossible to reduce the period of impregnation. It is not desirable to use the above described water-soluble organic compounds, since the removal of such organic compounds is very difficult.

The specification of Japanese Patent Publication No. 25147/1972 shows a process which prevents agglomeration of polymer particles during the step of impregnating particles with an expanding agent, by means of coating the surfaces of polymer particles with an oily agent such as mineral oil, polyethyleneglycol, dibutyl phthalate, etc., and coating the oily surface with a fine powder (which is insoluble in water and expanding agents) such as calcium carbonate, calcium silicate, magnesium carbonate, silica, talc, etc., and suspending the resulting coated particles in water. This method, however, has disadvantages in that it is necessary to subject the polymer particles to a two step surface coating in advance, and to use water-soluble organic compounds, e.g., polyvinylalcohol.

After the investigation of a process for improving the above-mentioned processes, we have found that excellent suspension stability and reduced period of impregnation are provided by using a small amount of fine powdered calcium carbonate having its surface treated with resin acid and it is not necessary to use a surface active agent and/or water-soluble organic compound having protective colloidal properties.

SUMMARY OF THE INVENTION

The present invention is directed to a method for the production of expandable ethylenically unsaturated polymer particles having excellent suspension stability which comprises using a calcium carbonate containing compound having its surface treated with resin acid as the suspension stabilizer. The process for the production of expandable ethylenically unsaturated polymer particles comprises the steps of dispersing ethylenically unsaturated polymer particles in water and adding thereto a volatile liquid organic expanding agent having a boiling point lower than the softening point of the polymer particles and conducting such process in the presence of the suspension stabilizer.

DETAILED DESCRIPTION

The present invention relates to a method for the production of expandable ethylenically unsaturated polymer particles which comprises using a calcium carbonate containing compound having its surface treated with resin acid as the suspension stabilizer. The method for the production of expandable ethylenically unsaturated polymer particles from ethylenically unsaturated polymer particles comprises suspending the particles in water and impregnating said particles with an organic expanding agent having a boiling temperature lower than the softening point of the polymer particles.

It is known that calcium carbonate can be used as a suspension stabilizer in the case of impregnating polymer particles with an expanding agent such as n-butane, n-pentane, neopentane, etc., in an aqueous suspension containing ethylenically unsaturated polymer particles. However, it has not been known that calcium carbonate, having its surface treated with resin acid, provides excellent results when used as a suspension stabilizer, when compared with calcium carbonate which is not treated with resin acid. Furthermore, calcium carbonate has not been used up to now, because suspension stabilizers such as phosphates, e.g., calcium phosphate and mixtures of anionic surface active agents and calcium phosphate are superior in results to calcium carbonate.

According to the present invention, excellent results are obtained by using calcium carbonate having its surface treated with resin acid as a suspension stabilizer. When ordinary surface active agents and/or water-soluble organic compounds are used and the step of recovering and/or releasing the expanding agent is carried out after the impregnation step, vigorous foaming occurs. In such cases, anti-foam agents must be used. On the other hand, in accordance with the present invention, foaming does not take place and it is not necessary to use anti-foam agents. The amount of calcium carbonate having its surface treated with resin acid attached to the surface of the resulting expandable polymer particles is very small and is easily removed from the polymer particles, for example, by washing, first, with a dilute solution of hydrochloric acid and then with water. Calcium carbonate remaining in the suspension medium can be easily removed by coagulation precipitation or by float separation. The process of the present invention, therefore, provides a very excellent process from the industrial point of view when compared with a process using a combination of phosphate or pyrophosphate compounds and anionic surface active agents.

Ethylenically unsaturated polymer particles used in the present invention include polymer particles of styrene or methacrylic acid ester prepared from hydrocarbon vinyl monomers such as styrene, methyl methacrylate and ethyl methacrylate, copolymer particles containing more than 50 weight percent of styrene and monomers copolymerizable with styrene such as methyl acrylate, ethyl acrylate, butyl acrylate, methyl methacrylate, ethyl methacrylate, acrylonitrile, α-methylstyrene divinylbenzene and copolymer particles containing more than 50 weight percent of methyl methacrylate or ethyl methacrylate and monomers polymerizable with methyl methacrylate or ethyl methacrylate such as butyl methacrylate, 2-ethylhexyl methacrylate, butyl acrylate, 2-ethylhexyl acrylate, ethyl acrylate, vinyl acetate, 1, 3-butadiene, styrene, α-methylstyrene and acrylonitrile. Furthermore, cross-linked ethylene polymer particles and ethylene polymer particles containing therein polymerized styrene monomer are also included within the scope of this invention. The styrene monomer is impregnated into the ethylene polymer particles and subsequently polymerized therein in the presence of a polymerization catalyst.

The size of the ethylenically unsaturated polymer particles is usually from 0.2 to 3 mm in diameter in the case of styrene polymer particles, styrene copolymer particles, methyl methacrylate polymer particles, ethyl methacrylate copolymer particles, methacrylic acid ester copolymer particles which are made by a suspension polymerization process and from 4 to 7 mm in diameter in the case of ethylene polymer particles of cylindrical or semispherical shape.

Ethylenically unsaturated polymer particles are dispersed in water. The polymer particles are dispersed preferably in the range of 50-140 parts by weight per 100 parts by weight of water, but the ratio of the polymer particles and water are not limited to the above ratio. In the present invention, agglomerated particles are not produced even if 100 parts by weight of polymer particles are dispersed in 100 parts by weight of water and then impregnated with expanding agent, since the calcium carbonate having its surface treated with resin acid provides excellent suspension properties.

The suspension stabilizer used in the present invention is calcium carbonate having its surface treated with resin acid.

The calcium carbonate having its surface treated with resin acid used in the present invention is believed to have the resin acid chemically and not physically combined with the surface of the calcium carbonate grain, as suggested in *Journal of the Society of Rubber Industry, Japan* (Nippon Gomu-Kyokaishi), Vol. 34, pp. 928–940, 1961, and Vol. 36, pp. 295–303, 1963, published by the Society of Rubber Industry, Japan (Nippon Gomu-Kyokai). However, the exact mechanism is not known. The resin acid chemically combined on the surface of the calcium carbonate grain is not separated by either expanding agent or organic solvent such as benzene and toluene.

Resin acids useful in the present invention comprises a major component of rosin. In General, rosin comprises a major amount, e.g., 80% to 97%, of resin acid and a minor amount, e.g., 20% to 3%, of non-acidic components. Resin acid contains aliphatic cyclic acids and aromatic acids, especially, diterpenic acid ($C_{19}H_{29}COOH$) as the main component. Diterpenic acid is a mono-carbonic acid of an alkylated hydrophenanthrene nucleus having two double bonds, and consists of the abietic acid type and pimaric acid type. It is to be understood, however, that the composition of the resin acid may vary according to the type and source of resin acid. As an example of the composition of one type of resin acid, the following is illustrative:

abietic acid; 30–40%
neoabietic acid; 10–20%
dihydroabietic acid; 14%
tetrahydroabietic acid; 14%
d-pimaric acid; 8%
iso-d-pimaric acid; 5%
dehydroabietic acid; 5%
levopimaric acid; 0.1%

In the present process, derivatives of resin acids such as the hydrogenated product of abietic acid, and alkaline metal salts are also useful. Each component such as abietic acid, pimaric acid or other resin acids may also be used individually in the present process.

The term "calcium carbonate containing compound" as used herein includes calcium carbonate and a complex salt of calcium carbonate and magnesium carbonate, either of which may be used in the present invention.

Calcium carbonate having its surface treated with resin acid is produced by the following processes:

A. Introducing carbon dioxide gas into a suspension medium containing calcium hydroxide and a small amount of resin acid or alkaline metal salts thereof.

B. Introducing carbon dioxide gas into a suspension medium containing calcium hydroxide to produce a suspension containing calcium carbonate and then adding a small amount of resin acid or alkaline metal salts thereof to the suspension medium.

Calcium carbonate having its surface treated with resin acid may be also prepared by adding sodium carbonate or sodium bicarbonate instead of introducing carbon dioxide in the process of A. and B. above.

Specifically, calcium carbonate having its surface treated with resin acid and also having a particular size of 0.02-0.2 microns, is prepared by introducing carbon dioxide gas into a suspension medium containing 100 parts by weight of calcium hydroxide and 1-9 parts by weight of a sodium salt of a resin acid, or by introducing carbon dioxide gas into a suspension medium containing calcium hydroxide to produce calcium carbonate followed by adding a sodium salt of resin acid thereto.

The treated calcium carbonate prepared by the above processes contains about 0.5-6 parts by weight of resin acid per 100 parts of calcium carbonate. The process of chemically attaching the above organic compounds on the surface of the calcium carbonate may be carried out in accordance with the process described in *Journal of The Society of Rubber Industry, Japan,* described above and the same Journal Vol. 34, pp 89-91 (1961).

The amount of resin acid necessary to obtain the desirable suspension results of the invention is about at least 0.5 parts by weight and preferably 1-5 parts by weight per 100 parts of calcium carbonate.

Resin acid has been found to have an excellent effect on the stability of suspensions by applying it to the surface of calcium carbonate. On the other hand, calcium carbonate treated with fatty acid, such as stearic acid, do not provide desirable results for the stability of suspensions. It is believed that calcium carbonate treated with resin acid strongly combines with the polymer particles, since the affinity of the aliphatic cyclic acid for the polymer particles is stronger than that of fatty acids.

Calcium carbonate treated with resin acid is used in the amount of 0.1-1% by weight of the ethylenically unsaturated polymer particles. In the case of using less than 0.1% by weight of calcium carbonate treated with resin acid, sufficient results for preventing agglomeration are not obtained, and in case of using more than 1% by weight, it is generally not economical, since further suspension properties are not obtained.

Calcium carbonate having its surface treated with resin acid may be added to water before, at the same time as or after dispersing the ethylenically unsaturated polymer particles. It is preferable to add the calcium carbonate before dispersing the polymer particles.

Said calcium carbonate employed as a suspension stabilizer in the present invention differs from what has been conventially employed in that it provides excellent suspension stabilizing properties over a wide range of temperatures, e.g., at from room temperature to 125° C.

Expanding agents are used in order to obtain expandable ethylenically unsaturated polymer particles. Expanding agents used in the present invention are organic compounds of a liquid or gaseous substance at room temperatures and have a boiling point lower than the softening point of the polymer particles, preferably lower than 100° C. and do not dissolve the polymer particles, or may slightly wet the surfaces of the polymer particles. Preferred expanding agents which may be employed in this invention include hydrocarbons and halogenated hydrocarbons such as propane, propylene, n-butane, iso-butane, n-pentane, neopentane, iso-pentane, n-hexane, cyclohexane, n-heptane, dichlorofluoromethane, dichlorofluoromethane, monochloro-trifluoromethane, trichlorofluoromethane, methyl chloride, ethyl chloride and propyl chloride.

These expanding agents may be used alone or as mixtures thereof. Expanding agents are used generally in amounts of 3-20 parts by weight of 100 parts of the ethylenically unsaturated polymer particles.

Expanding agents are added continuously and a little at a time to a suspension of ethylenically unsaturated polymer particles at a temperature range of from room temperature to 125° C over a period of several minutes and under pressure. An expanding agent such as pentane is added under pressure within a short period to a suspension having a temperature such as 20°-40° C, then the temperature is raised to over 80° C at which temperature said expanding agent is impregnated, or the temperature of the suspension is first raised over 80° C and then said liquid expanding agent is added under pressure within a short period. The suspension stability in the present invention is not influenced in either case. It is preferred to add expanding agents to the suspension medium at a temperature of from 80° to 120° C in order to increase the rate of impregnation of the expanding agent into the polymer particles. It is also possible to add the expanding agent at room temperature under pressure without using a high pressure pump, and then to raise the temperature for the purpose of impregnating the expanding agent into the polymer particles. In this case, the period of adding the expanding agent may be shortened. Spherical shaped ethylenically unsaturated polymer particles may be made from those having a pellet shape during the course of the impregnation step under heating. In this case, it is desirable to add the expanding agent at higher temperatures such as above 100° C.

In accordance with the present invention agglomerated polymer particles are not produced in the suspension system from room temperatures to 125° C when impregnating the polymer particles with an expanding agent. On the other hand, when untreated calcium carbonate is used, many agglomerated particles are produced even if the calcium carbonate is used in great quantities, such as 2 parts by weight of the polymer particles. From the above, it is seen that the process of the present invention provides excellent results in preventing the agglomeration of polymer particles by using the particularly described calcium carbonate having its surface treated with resin acid.

Calcium carbonate having its surface treated with resin acid is preferably used alone, but may also be used together with fine powders of other inorganic compounds. However, using calcium carbonate having its surface treated with resin acid together with organic substances such as surface active agents and/or protective colloidal substances is not preferable, since, in general, they have a tendency to provide undesirable results.

The process using calcium carbonate having its surface treated with resin acid as a suspension stabilizer also has great advantages from the economical point of view, since the expanding agents are adequately impregnated into the polymer particles by using a small quantiy of the treated calcium carbonate, without the need for using any auxiliary dispersing agent such as a surface active agent or an organic substance having protective colloidal properties.

In the process of the present invention, flame retardant agents such as tris (2,3-dibromopropyl) phosphate, hexabromocyclododecane and tribromophenylallylether and auxiliary flame retarding agents such as dicumyl peroxide may be added for producing flame retardant expandable polymer particles. Furthermore, dyestuffs, anti-static agents, etc. may also be added.

Agglomerated polymer particles are not produced in the process of this invention within the range from room temperatures to 125 C, since calcium carbonate having its surface treated with resin acid provides excellent results as to the stability of suspensions even when used in small amounts. Excess amounts of the expanding agent can be quickly released from the reaction system, after impregnation of the particles without using any anti-foam agent. On the other hand, it is necessary to use and anti-foam agent when water-soluble organic compounds having high molecular weights or surface active agents are used, since they cause vigorous foaming. Calcium carbonate having its surface treated with resin acid can be removed easily from the expandable polymer particles by washing with water and repeated washings are not necessary. Treatment of waste water can be also carried out easily. The process of the present invention provides various, significant advantages.

The following examples are given to illustrate the invention, and are not intended to limit the scope thereof.

EXAMPLE 1 a. 1000 ml of water and 100 g of calcium hydroxide were placed in a 2 liter reaction vessel equipped with a stirrer, and then the amounts described in the following Table 1 of sodium salts of resin acid where added into the mixture while stirring, and the stirring was continued for 30 minutes. While maintaining the produced suspension medium at 5°–6° C, carbon dioxide gas was introduced into the suspension medium at a rate of 8 liters per minute until the suspension medium had a pH of 7. The suspension medium was filtered and dried at room temperature. Calcium carbonate having its surface treated with resin acid having an average particle size of 0.04–0.15 microns was obtained.

As a control, untreated calcium carbonate was prepared by the same method as described in (a) above except that sodium salts of resin acid were not used.

Table 1

| No. | Amount of sodium salts of resin acid/ 100 g of calcium hydroxide (g) | Note |
|---|---|---|
| a-1 | 0 | untreated CaCO$_3$ |
| a-2 | 0.5 | treated CaCO$_3$ |
| a-3 | 1 | " |
| a-4 | 3 | " |
| a-5 | 6 | " | b. 2200 g of water and the amounts described in the following Table 2 of calcium carbonate having its surface treated with resin acid as a suspension stabilizer, and untreated calcium carbonate as a control, were placed in a 5.6 liter autoclave. Then, 2200 g of styrene polymer particles, having a size of 1.0 – 0.6 mm in diameter, were dispersed in the above suspension medium, and the autoclave was closed tightly. After heating the suspension to 110° C over a period of 30 minutes, while stirring at rate of 320 rpm, 220 g of n-pentane, an expanding agent, were continuously added, under pressure.

The mixture was maintained at 110° C for 2 hours in order to sufficiently impregnate n-pentane into the polymer particles. After cooling to 30° C, the produced expandable styrene polymer particles were taken out. The conditions of the obtained polymer particles are shown in the following Table 2.

Table 2

| No. | Suspension stabilizer (in Table 1) | Amount of suspension stabilizer (g) | Suspension stabilizer % polymer particles | Conditions of obtained expandable polymer particles |
|---|---|---|---|---|
| 1 | a-1 | 11 | 0.5 | blocking in whole |
| 2 | a-1 | 22 | 1.0 | much agglomerated |
| 3 | a-2 | 11 | 0.5 | little agglomerated |
| 4 | a-3 | 11 | 0.5 | not agglomerated |
| 5 | a-4 | 11 | 0.5 | " |
| 6 | a-5 | 11 | 0.5 | " |

EXAMPLE 2

2200 g of water and 6.6 g of calcium carbonate having its surface treated with resin acid obtained by the process of Example 1, a-4 above were placed in a 5.6 liter autoclave, and 2200 g of methyl methacrylate-butyl acrylate-α-methylstyrene copolymer having a particle size of 1.0 – 0.6 mm in diameter of particles, consisting of 90 parts of methyl methacrylate, 5 parts of butyl acrylate and 5 parts of α-methylstyrene were added and the autoclave was closed tightly. 242 g of n-pentane, expanding agent, were added while stirring at a rate of 320 rpm at room temperatures. After heating the mixture to 115° C over a period of 60 minutes, impregnation of the particles was continued for 6 hours at 115° C, and the mixture was cooled to 30° C. The resulting expandable copolymer particles were then removed from the autoclave. Thus the obtained expandable copolymer particles contained no agglomerated particles. When these expandable copolymer particles were heated with steam, pre-expanded particles were obtained which had a density of 0.0189.

EXAMPLE 3 a. 1,000 ml of water and 100 g of calcium hydroxide were placed in a 2 liter vessel equipped with a stirrer, and carbon dioxide was introduced into the suspension medium at a rate of 8 liters per minute until a pH of 7 was obtained for the suspension medium, to produce a mixture containing a suspension of fine particles of calcium carbonate. To this suspension medium, a solution containing 4 g of sodium salt of resin acid in 100 ml of water were added and the mixture was stirred vigorously for 30 minutes, followed by filtering and drying of the particles at room temperature. Calcium carbonate having its surface treated with resin acid was obtained.

b. In a 5.6 liter autoclave, 2200 g of water and 11 g of calcium carbonate having its surface treated with resin acid as described in Example 3 (a) were added and then 2200 g of styrene-butyl acrylate copolymer particles having a size of 1.0 – 0.6 mm in diameter, consisting of 98 parts of styrene and 2 parts of butyl acrylate, were added and the vessel was closed tightly. Into this mixture, 242 g of butane were added and the temperature was raised to 100° C over a period of 50 minutes. After the impregnation was continued for 3 hours at 100° C, the mixture was cooled to 30° C, and the excess expanding agent was released without foaming. The resulting expandable copolymer particles contained no agglomerated particles.

c. A comparative example using a surface active agent together with a suspending agent is shown, in order to compare with the example of this invention. The treatment was carried out in the manner described in Example 3(b) excepting that 17.6 g of calcium phosphate and 0.33 g of sodium dodecylbenzenesulfonate were used instead of calcium carbonate having its surface treated with resin acid.

It was almost impossible to release the excess expanding agent because of vigorous foaming.

EXAMPLE 4

2200 g of water and 4.4 g calcium carbonate having its surface treated with resin acid prepared in Example 1, a-4 were added to a 5.6 liter autoclave. To this mixture, 2200 g of ethylene polymer particles impregnated with styrene polymer were added and the autoclave was closed tightly. The polymer particles were produced by impregnating 60 parts of ethylene polymer pellets with 40 parts of styrene monomer and the reaction was conducted in the presence of 0.2 parts of benzoyl peroxide in an aqueous suspension at 80° C, and the polymerization was completed by heating the suspension to 120° C, followed by cooling and removing the produced copolymer particles from the autoclave.

The above mixture was stirred at a rate of 320 rpm and 242 g n-butane were added and the mixture was heated to 100° C over a period of 50 minutes. After impregnating the particle with n-butane for 5 hours at 100° C, the mixture was cooled to 30° C. The resulting expandable polymer particles contained no agglomerated particles.

The expandable polymer particles produced by the above process were heated with steam for 1 hour after they were produced and resulted in pre-expanded particles having a density of 0.0667. It was found that the expanded polymer particles had considerable elasticity.

EXAMPLE 5

The following compounds were used as suspension stabilizers.

a. calcium carbonate untreated, having average size of 0.08 – 0.1 micron.

b. calcium carbonate having its surface treated with resin acid, and having an average particle size of 0.04 micron.

c. a complex salt of calcium carbonate and magnesium carbonate having its surface treated with resin acid and having an average particle size of 0.05 microns.

In separate tests, the suspension stabilizers shown in (a), (b), and (c) above were added to a 5.6 liter autoclave which contained 2100 g of water, said stabilizers being added in the amounts as shown in Table 3. 2400 g of styrene polymer particles having an average particle size of 1.0 – 0.6 mm in diameter were added to the mixture and the autoclave was closed tightly. The mixture was stirred at a rate of 320 rpm and heated to 120° C over a period of 30 minutes. 220 g of n-pentane were added. The mixture was maintained for 2 hours at 120° C and cooled to 30° C.

Properties obtained for the expandable styrene polymer particles are shown in Table 3.

Table 3

| No. | | Suspension stabilizer | Amount of suspension stabilizer used | Condition of obtained expandable polymer particles |
|---|---|---|---|---|
| 1 | a) | untreated calcium carbonate | 6.6g (0.3%) | blocking in whole |
| 2 | a) | untreated calcium carbonate | 22 g (1.0%) | much agglomerated polymer particles |
| 3 | b) | treated calcium carbonate | 6.6g (0.3%) | no agglomerated polymer particles |
| 4 | c) | treated complex salt of calcium carbonate and magnesium carbonate | 6.6g (0.3%) | no agglomerated polymer particles |

Note: % in the column of amount of suspension stabilizer used, means % by weight of polymer particles.

From the above data, it is easily seen that the calcium carbonate and complex salt of calcium carbonate and magnesium carbonate having its surface treated with resin acid provide excellent results as to suspension stability.

EXAMPLE 6

Into a 5.6 liter autoclave are placed 2200 g of water and 13.2 g of calcium carbonate having its surface treated with resin acid, as shown in Example 5,b). To this mixture, 2200 g of styrene polymer particles having a particle size of 1.0-0.6 mm in diameter were added and the mixture was stirred at a rate of 320 rpm. 26.4 g of tribromophenylallylether were added as a flame retarding agent, and the autoclave was closed tightly and heated to 120° C over a period of 30 minutes. After maintaining a temperature of 120° C for 1 hour, 176 g of n-pentane were added. After impregnation was carried out for 4 hours at 120° C, the mixture was cooled to 30° C and the produced expandable polymer particles were removed. The suspension stabilizer was decomposed by adding hydrochloric acid to the suspension medium to bring its pH to 3. After washing and drying, flame retardant, expandable styrene polymer particles were obtained. The obtained polymer particles include no agglomerated polymer particles.

Pre-expanded polymer particles having a density of 0.020 were obtained by heating the above obtained expandable styrene polymer particles with steam after 1 hour from the production. Furthermore, flame retardant cellular shaped articles were obtained by heating the pre-expanded polymer particles in a mold cavity. Test results of the cellular shaped articles were obtained by heating the pre-expanded polymer particles in a mold cavity. Test results of the cellular shaped articles as to self-extinguishing properties according to UL-94 show that the cellular shaped articles correspond to HEF No. 1, and, therefore, the cellular shaped articles have excellent self-extinguishing properties.

What is claimed is:

1. In the method for the production of expandable ethylenically unsaturated polymer particles comprising inpregnating a suspension of said particles with a volatile organic expanding agent, said agent having a boiling point lower than the softening point of the polymer particles and which does not dissolve the polymer particles, said particles being prepared by the polymerization of an ethylenically unsaturated hydrocarbon monomer in an aqueous suspension, the improvement which comprises adding to the suspension a resin acid treated calcium carbonate compound in an amount from 0.1 – 1% by weight of the polymer particles as a suspension stabilizer, wherein the calcium carbonate has a particle size of from 0.02 – 0.2 microns in diameter and has chemically combined on the surface thereof a resin acid in an amount of 0.5 – 6.0 parts per 100 parts by weight of calcium carbonate.

2. The process of claim 1, wherein said ethylenically unsaturated polymer particles are prepared from monomers selected from the group consisting of styrene, methyl methacrylate and ethyl methacrylate.

3. The process of claim 1, wherein said ethylenically unsaturated polymer particles are prepared from styrene copolymers containing more than 50% by weight styrene and monomers selected from methyl acrylate, ethyl acrylate, butyl acrylate, methyl methacrylate, ethyl methacrylate, acrylonitrile, α-methylstyrene, divinylbenzene and mixtures thereof.

4. The process of claim 1, wherein said ethylenically unsaturated polymer particles are prepared from methacrylate copolymers containing more than 50% by weight of methacrylate, said methacrylate being selected from the group consisting of methyl methacrylate and ethyl methacrylate, and monomers selected from the group consisting of butyl methacrylate, 2-ethylhexyl methacrylate, butyl acrylate, 2-ethylhexyl acrylate, vinyl acetate, 1, 3-butadiene, styrene and α-methylstyrene and mixtures thereof.

5. The process of claim 1, wherein said ethylenically unsaturated polymer particles are prepared from polymers selected from the group consisting of cross-linked ethylene polymers and ethylene polymers containing therein polymerized styrene monomer.

6. The process of claim 1, wherein said expanding agent is a compound selected from the group consisting of propane, propylene, n-butane, i-butane, n-pentane, neopentane, i-pentane, n-hexane, cyclohexane, n-heptane, dichlorofluoromethane, dichlorodifluoromethane, monochlorotrifluoromethane trichlorofluoromethane, methyl chloride, ethyl chloride and propyl chloride.

7. The process of claim 6, wherein said expanding agent is used in an amount of 3–20 parts by weight of 100 parts of ethylenically unsaturated polymer particles.

8. The process of claim 1, wherein said calcium carbonate is treated with a resin acid which contains deterpenic acid as a main component.

9. The process of claim 1, wherein said calcium carbonate is a complex salt of calcium carbonate and magnesium carbonate.

* * * * *